Aug. 28, 1945.   P. B. KRAUS   2,383,868
FILTERING DEVICE
Filed Dec. 2, 1943

*Philip B. Kraus* INVENTOR.

BY *Walter C. Wheeler*

ATTORNEY

Patented Aug. 28, 1945

2,383,868

UNITED STATES PATENT OFFICE 2,383,868

FILTERING DEVICE

Philip B. Kraus, Chadd's Ford, Pa., assignor to E. I. du Pont de Nemours & Company, Wilmington, Del., a corporation of Delaware Application December 2, 1943, Serial No. 512,523

4 Claims. (Cl. 210—188)

This invention relates to improvements in filtering apparatus, such as filter presses.

In the operation of filter presses wherein the feed liquor is pumped under pressure into a compartment faced with the filtering medium, such as filter packs or cloths, and the passage from the pump to the compartment is formed by registering openings through the filter plates, filter cloths and spacer members, and these parts are superimposed upon one another and held together by clamping, the edges of the filter packs or cloths are exposed to the incoming unfiltered liquor. More or less filtering consequently occurs edgewise through the filtering medium resulting in a building up of sludge in the passage, and stoppage occurs. Leakage frequently occurs between the filter pack and the faces of the filter plate or spacers, particularly when the plates and spacers become irregular or warped through use, or when excessive clamping pressures are not applied to hold the several parts of the press together. Heretofore insoluble adhesive material, such as latex, has been applied to the edges of filter packs to prevent filtration through the edges thereof, but this expedient is of no effect in preventing leakage around the edges of the filter pack. It is therefore desirable to provide means for accomplishing better operation of such apparatus and improvements therein.

It is among the objects of the present invention to provide means for preventing the leakage around the filter medium in apparatus of the kind described and for preventing the building up of sludge in the incoming passage. Other objects of the invention will be apparent from the following description.

Figure 1:
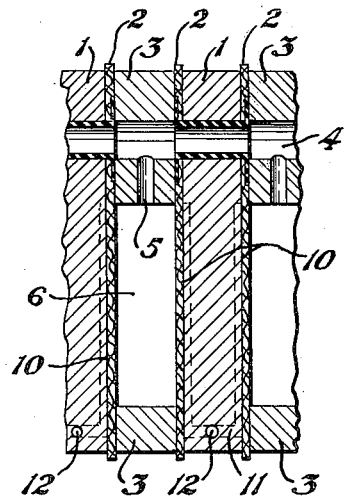
Figure 2:
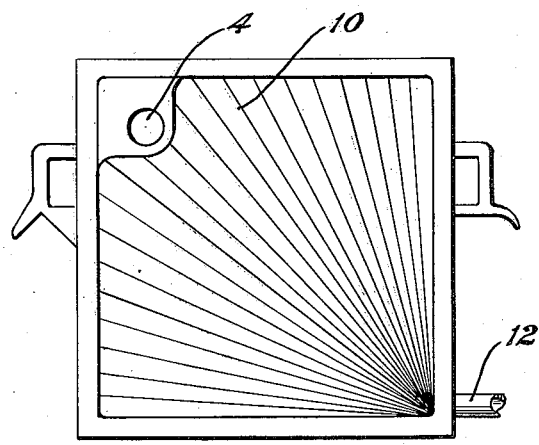
Figure 3:
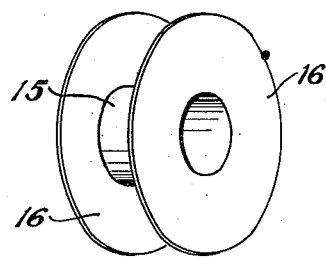
Figure 4:
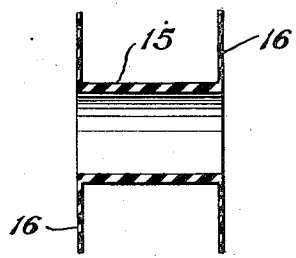

The objects of the invention are attained in general by providing a grommet-like member which is disposed in the passage so as to act as a liner for the opening in the plate and filter material and as a sealing member between the outer faces of the filtering members and the contacting spacer members, as more particularly set forth in the following description and the drawing wherein Figure 1 is a partial cross-sectional view of a filter press showing the filter plates, spacers, filter packs and grommet element assembled in position for operation, Figure 2 is a side elevational view of a filter plate, Figure 3 is a perspective view of the grommet, and Figure 4 is a cross-sectional view of the grommet taken along a longitudinal diametrical plane.

Referring to Figure 1, a conventional filter press comprising filter plates 1 having filter cloths or filter packs 2 spread over the grooved faces thereof are spaced apart by the spacer members 3. Openings through the plates, filter cloths or packs and the spacer members are located to register with each other and form the feed passage 4 when the parts are assembled in the press to provide a passage which is connected with a source of liquor under pressure to be filtered. A branching passage 5 between the passage 4 and liquor space 6 is provided in the spacer member 3, and the liquor to be filtered is pumped therethrough into the space 6 from whence it is forced under pressure through the filter cloths 2 into the grooves 10 formed in the face of the filter plate. The filtered liquor then passes through the passages formed by the inner face of the filter cloths 2 and the grooves 10 to the communicating passage 11 and discharge ports 12.

In filter presses, the filter plates and spacer members are commonly provided with brackets at the sides which rest on parallel horizontal tracks extending lengthwise of the press, and they are assembled with the filter cloths disposed between the filter plates and spacers. The assembly is then forcibly held together by a clamp or clamps bearing endwise so that the parts of the filter cloths disposed between the plane faced outer marginal parts of the spacer rings and plates act as sealing gaskets to prevent leakage to the outside.

However, it frequently happens that leakage from the passage 4 to the grooves 10 occurs between the filter pack and the filter plate, resulting in muddy filtrates, particularly when fine solids are filtered out or when the facings of the plates or spacer members become damaged through use or by reason of a small diminution in the thickness of the pack around the opening. A frequent difficulty results from filtration through the edge of the pack around the opening. This results in a deposition of solids in the passage 4 around the margin of the opening and stoppage of the passage, causing unequal pressures on opposite sides of the filter plates and thereby promoting premature failure of the filter plates.

The filter plates 1 are commonly made as thin as possible so that a maximum of space 6 for the filtered solids can be provided in a filter press of given length. Thus there is presented a weakened area in that part of the filter plate in the region of the opening 4, and breakage thereat is frequent, especially when the filter plates are constructed of wood as in the filtration of acidic liquors.

In accordance with the present invention a grommet, shaped in general similar to a spool, is provided to act as a liner for that part of the passage 4 which is formed by the openings through the filtering material and the filter plates, and depending end portions concentric with the tubular liner portion. The grommet comprises a tubular portion 15 which forms the liner for the passage 4 when it is in place. The tubular portion is desirably provided with thickened walls for rendering the tubular portion self-sustaining and somewhat compressible, thereby preventing collapse thereof when the grommet is slightly shortened by clamping together the units of the filter press. Depending at the ends of the tubular portion are outwardly extending ring shaped members 16 or skirts. The ring shaped members 16 or skirts are desirably disposed perpendicular to the axis of the tubular member and are formed of thin flexible compressible material so that upon being compressed between the outer face of the filter pack and the spacer member, a seal will be provided without unduly distorting the filter pack. The ring shaped members 16 should be sufficiently flexible to enable a skirt to be gathered together outwardly along the axis of the tubular portion so that the grommet can be inserted endwise into the opening formed when a plate with its filter packs is assembled. The grommet may be composed of any flexible compressible material, depending upon the character of the solutions being filtered. Rubber is a desirable material in that it is resistant to acid, alkaline and neutral solutions and is flexible, non-adhesive and compressible, but the grommet can be composed of other suitable material.

Filter packs or cloths, filter plates and spacer members of conventional construction can be used. It is convenient first to assemble the filter pack and filter plate as a unit by disposing the filter pack or cloth in position on one or both faces of the filter plate, depending upon whether the plate is provided with one or two filter supporting surfaces. This can be done while resting the several parts in the filter press frame. Then the skirt 16 at one end of the grommet is gathered together so that the skirted end will pass through the passage formed by the openings in the filter plate and filter pack. The grommet is then brought into position with the skirts 16 at the extreme ends disposed on the outer faces of the filter packs and the tubular portion 15 forming a liner for passage 4 bridging the filter plate and filter material. In cases where the filter plate is formed on only one side for filtering, the skirt 16 at the outer end provides an excellent gasket. With the grommet in position, the spacer frame 3 is assembled with the plates and the press is completed and clamped in the usual manner, except that in assembling the press with the grommets it has been found that somewhat less resultant pressure is needed to form the necessary seal. The thin skirted ends of the grommets form an excellent seal for preventing filtering at the edge of the filter pack and for preventing leaks at the edges. The accumulation of solids at the edge of the filter pack which often occurs when filtering relatively thick sludges is entirely prevented. The grommets can be used repeatedly.

Preferably the tubular wall portion 15 of the grommet is made relatively thick and the skirts 16 are made relatively thin for providing freedom from collapsing of the tubular portion when the press is clamped together at the end and to avoid excessive local thickness of material between the spacer rings and plates. In a grommet having a two inch diameter passage a tubular wall section of rubber of about one-eighth inch thickness and skirts about one thirty-second of an inch thick are sufficient, but it is evident that these thicknesses and other proportions of the grommet can be widely varied.

From the foregoing disclosure it will be recognized that the invention is susceptible of modification without departing from the spirit and scope thereof and it is to be understood that the invention is not restricted to the specific illustrations thereof herein set forth.

I claim:

1. In a filter press constructed of a plurality of filter plates faced with filtering members and spacer members disposed between the facings of the filter plates for providing a closure around the margins of the plates and an enclosure for unfiltered liquids in the inter-marginal area, said plates, filtering members and spacer members being provided with registering openings therethrough for forming a feed passage when said elements are in juxtaposition; means for sealing around the margins of the openings through the filtering material which comprises a member composed of flexible compressible material having a tubular portion disposed for lining the passage through a plate and the filtering member facing said plate, and flexible skirting portions at the ends of said tubular portion, said skirting portions being disposed between the outer face of the filtering member and the spacer ring when the filter press is assembled.

2. The device in accordance with claim 1 in which the tubular portion is self-sustaining.

3. The device in accordance with claim 1 in which the skirting portions are relatively thin.

4. The device in accordance with claim 1 in which the skirting portions are in a plane perpendicular to the axis of said tubular portion.

PHILIP B. KRAUS.